Aug. 15, 1967 R. T. MURPHY 3,336,518
SAMPLE AND HOLD CIRCUIT
Filed Aug. 5, 1964
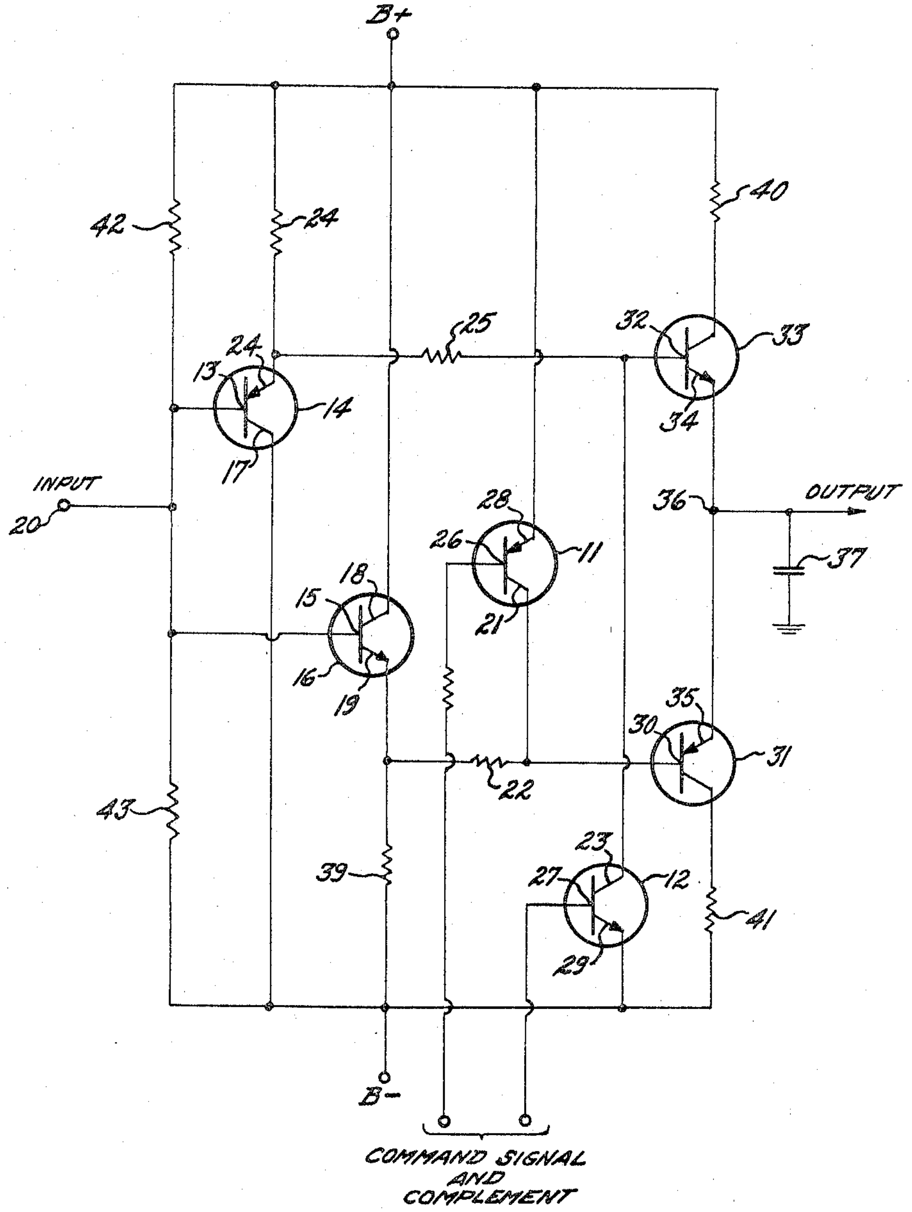
INVENTOR.
ROBERT T. MURPHY
BY Wade Koontz, Jr.
George Fine
ATTORNEYS United States Patent Office
3,336,518
Patented Aug. 15, 1967

3,336,518

SAMPLE AND HOLD CIRCUIT

Robert T. Murphy, Palo Alto, Calif., assignor to the United States of America as represented by the Secretary of the Air Force Filed Aug. 5, 1964, Ser. No. 387,815
1 Claim. (Cl. 320—1)

ABSTRACT OF THE DISCLOSURE

A sample and hold circuit having a first pair of complementary transistors with the input signal applied to the bases and power supplies of opposite polarities applied to the collectors. The emitters are connected to the collectors of a second pair of complementary transistors which have their emitters connected to power supplies of opposite polarities, a command signal applied to the bases, and the collectors connected to the bases of a third pair of complementary transistors. The command signal saturates the second pair of transistors making the bases of the third pair of transistors equal to the power supply. The input signal acting together with the power supply turns on the third pair and disconnects a holding capacitor connected to the emitters thereof.

This invention relates to a sample and hold circuit and, more particularly, to a sample and hold circuit that permits bilateral charging.

This invention provides a sample and hold circuit that will sample an input signal upon command, hold this sampled value as a stored charge upon a capacitor until the next command, at which time the circuit samples another input signal having a different value and holds the new signal value. The invention can be used for sampling and holding of outputs of a multi-channel demultiplexer in a pulse amplitude modulated-frequency modulated ground station.

The present day method uses a circuit which has unilateral charging, thus necessitating a dump circuit previous to each sample. An alternate method that is used is to utilize a 4-diode gate as a switch, but there is a disadvantage in that the high supply voltages are required and there is a requirement for a source supply bias current for the switch.

This invention has an advantage and novelties that the circuit has bilateral charging, zero DC offset from input to output, low supply voltage requirement, essentially no bias circuit required of the source, and high input impedance.

It is therefore an object to provide a novel sample and hold circuit.

It is another object to provide a sample and hold circuit that offers bilateral charging.

These and other advantages, features and objects of the invention will become more apparent from the following description taken in connection with the illustrative embodiment in the accompanying drawing, wherein the figure is a circuit diagram showing an embodiment of the invention.

Referring to the figure in detail, the signal to be sampled is fed into the circuit at point 20 which introduces the signal to base 13 of PNP transistor 14 and base 15 of NPN transistor 16. Collector 17 of transistor 14 is connected to a B— supply voltage and collector 18 of transistor 16 is connected to a B+ power supply. Collector 21 of PNP transistor 11 is connected to emitter 19 of transistor 16 through resistor 22. Collector 23 of NPN transistor 12 is connected to emitter 24 of transistor 14 through resistor 25. The command signal is fed to base 26 of transistor 11 and base 27 of transistor 12. Emitters 28 and 29 of transistors 11 and 12 are connected to the B+ and B— power supplies, respectively. Collector 21 of transistor 11 is connected to base 30 of PNP transistor 31 and collector 23 of transistor 12 is connected to base 32 of NPN transistor 33. Emitters 34 and 35 of transistors 33 and 31, respectively, are joined at common point 36. Holding capacitor 37 is connected to common point 36 and the output signal is taken from common point 36.

There are two modes of operation of this circuit, the holding mode or the off condition and the charging mode or on condition.

In the off condition transistors 11 and 12 are saturated by the application of a positive signal and its complement to the bases of transistors 11 and 12. The effect of these transistors being saturated pulls the base of transistor 33 to approximately B— and the base of transistor 31 to approximately B+. If the input signal at point 20 and thus the voltage on the holding capacitor 37 is restricted to between the limits of one-half B+ and one-half B—, transistors 31 and 33 will be turned off. This effectively disconnects holding capacitor 37 from the circuit with the exception of unequal leakage currents in transistors 31 and 33. The holding capacitor 37 will then retain its previous charge as determined by the input signal at point 20. Transistors 14 and 16 are also in the off condition because the saturation current for transistor 12 must flow through resistor 39 and resistor 22. This keeps emitter 24 of transistor 14 at a relatively low potential and emitter 19 of transistor 16 at a relatively high potential assuring both transistors 14 and 16 are in the off condition. Thus, the input impedance of the circuit is extremely high in the holding mode. The base leakage current in transistors 14 and 16 tend to cancel out because complementary transistors are used.

In the charging mode or on condition, transistors 11 and 12 are off and are essentially disconnected from the circuit. If at the start of the charging interval the input signal at point 20 is greater than previous voltage being held on capacitor 37, capacitor 37 will start to charge toward B+ until transistor 31 is turned on slightly and the DC offset from input to output becomes approximately zero. Ideally the voltage rise from base to emitter of transistor 14 should be exactly equal to the voltage drop across resistor 25 and the base to emitter junction of transistor 31. If the voltage on capacitor 37 is greater than the input signal at the start of the charging interval, capacitor 37 will start to discharge toward B— through transistor 31. This rapid discharging will continue until the circuit is caught by transistor 16 turning the transistor 31 off. At this time, transistor 33 will be turned on slightly and the circuit will be balanced as described above.

Resistors 40 and 41 are small and are used to limit the peak currents in the NPN and PNP complementary transistors 33 and 31. Resistors 42 and 43 are large resistors for limiting the circuit operation if the low impedance source at point 20 is removed.

Although the invention has been described with reference to a particular embodiment, it will be understood to those skilled in the art that the invention is capable of a variety of alternative embodiments within the spirit and scope of the appended claim.

What is claimed is:

An electronic circuit for sampling an input signal and holding the input signal until a command signal is given comprising: a first pair of complementary transistors each having a base, emitter, and collector, an input signal being applied to each of the bases; a positive voltage supply applied to the collector of one of the first pair of transistors; a negative voltage supply applied to the collector of the other of the first pair of transistors; a second pair of complementary transistors each having a base, emitter, and collector wherein the collectors of each of said second pair is resistively connected to the emitters of the first pair of transistors, emitters of each of the second pair are connected to opposite supply voltages and the bases of the second pair of transistors are connected to the command signal; a third pair of complementary transistors each having a base emitter and collector wherein the bases of each of the third pair of transistors is connected to the collectors of the second pair of transistors and the emitters are connected in common; and a holding capacitor connected to the emitters of the third pair of transistors.

References Cited

UNITED STATES PATENTS

| | | | |
|---|---|---|---|
| 2,902,674 | 9/1959 | Billings et al. | 320—1 X |
| 3,075,086 | 1/1963 | Mussard | 320—1 X |
| 3,161,858 | 12/1964 | Sanders et al. | 340—173 |

BERNARD KONICK, *Primary Examiner.*

J. BREIMAYER, *Assistant Examiner.*